United States Patent [19]

Shustova et al.

[11] 4,128,707

[45] Dec. 5, 1978

[54] METHOD FOR STABILIZATION OF FLUORO-ORGANIC COPOLYMERS OF THE ETHYLENE SERIES

[76] Inventors: Olga A. Shustova, Grokholsky pereulok 30, korpus 1, kv. 41; Georgy P. Gladyshev, Vinnitskaya ulitsa 5, kv. 111; Eduard K. Kondrashov, 13 Parkovaya ulitsa 31, korpus 1, kv. 21; Leonid D. Shustov, bulvár generala Karbysheva 6, korpus 1, kv. 28, all of Moscow, U.S.S.R.

[21] Appl. No.: 814,483

[22] Filed: Jul. 11, 1977

[51] Int. Cl.$^2$ .............................. C08F 8/18; C08F 8/00
[52] U.S. Cl. ........................................ 526/43; 526/12; 526/42
[58] Field of Search .............................. 526/42, 43, 12

[56] References Cited

U.S. PATENT DOCUMENTS

| 2,913,449 | 11/1959 | Hoerger et al. | 526/43 |
|---|---|---|---|
| 3,853,828 | 12/1974 | Wall et al. | 526/42 |

OTHER PUBLICATIONS

Schonhorn et al., "Surface Treatment of Polymers," Jour. Applied Polymer Science, vol. 12, pp. 1231–1237 (1968).

*Primary Examiner*—William F. Hamrock
*Attorney, Agent, or Firm*—Lackenbach, Lilling & Siegel

[57] ABSTRACT

A method for stabilization of fluoro-organic copolymers of the ethylene series which comprises mixing said copolymer with xenon difluoride taken in an amount ranging from 0.1 to 15% by weight of the starting copolymer at a temperature not exceeding 20° C.

The method according to the present invention makes it possible to produce copolymers and articles therefrom having an increased thermal stability and longer service life as compared to those produced by the prior art methods. The method is versatile. It is applicable to any type of copolymer of the ethylene series containing bonds which are weaker than the C - F bond.

4 Claims, No Drawings

METHOD FOR STABILIZATION OF FLUORO-ORGANIC COPOLYMERS OF THE ETHYLENE SERIES

The present invention relates to methods for stabilization of fluoro-organic copolymers of the ethylene series.

These copolymers are extensively used in different branches of industry. They are useful in the manufacture of various assemblies, parts, structures and in the preparation of sealing compounds, rubbers, vulcanizates and polymeric coatings.

The versatile applications of fluoro-organic copolymers of the ethylene series stems from good processability characteristics. They are capable of being dissolved in a great number of organic solvents, readily mouldable and upon incorporation of appropriate curing or vulcanizing agents, these copolymers are capable of chemically reacting to form materials possessing enhanced physicomechanical properties.

Most widely employed, among these copolymers, are a copolymer of trifluorochloroethylene with vinylidene fluoride, a copolymer of tetrafluoroethylene with vinylidene fluoride, a copolymer of hexafluoropropylene with vinylidene fluoride, and the like.

These copolymers are solid or rubber-like products, depending on the molar ratio between the starting monomers. The presence, in said copolymers, of hydrogen, chlorine atoms and of double bonds improves their processability as compared to that of polytetrafluoroethylene - a most heat-resistant polymer, but lowers their stability against thermo-oxidative destruction. Thus, polytetrafluoroethylene loses 50% of its weight at 470° C., whereas the above-mentioned copolymers - already at a temperature within the range of from 350° to 380° C. Such a noticeable drop in their heat resistance is caused by the fact that the C—F bond is much more durable than C—H, C—Cl and C=C bonds.

Known in the art are various methods for stabilization of fluoro-organic copolymers of the ethylene series contemplating the use of various stabilizing additives such as salts of alkali and alkali-earth metals, amines, derivatives of phenols, nitrogen- and phosphorus-containing organic compounds. The highest stabilizing effect is provided upon incorporation, into the copolymer, of acceptors of hydrogenhalides such as $CaF_2$, NaF, MgO, CaO, ZnO.

Thus, upon incorporation of $CaF_2$ into rubber, its thermal stability at 250° C. is increased. However, even in this case the ultimate tensile strength is substantially lowered, i.e. from 260 kgf/cm$^2$ (prior to thermal aging) down to 93–70 kgf/cm$^2$ (after thermal aging at 250° C. for 10 hours) and relative elongation falls from 470 to 200–280%. At higher temperatures these fluorides possess no stabilizing effect. Longer duration of thermal aging results in breakdown of the vulcanizates.

It is an object of the present invention to provide a method for stabilization of fluoro-organic copolymers of the ethylene series which would make it possible to substantially increase the operating temperature of a polymer or an article made therefrom as well as to prolong its service life.

This and other objects of the present invention are accomplished by a method according to the present invention wherein a fluoro-organic copolymer of the ethylene series is mixed with an inorganic fluoride and the mixing is performed at a temperature of at most 20° C. As the inorganic fluoride, use is made of xenon difluoride in an amount of from 0.1 to 15% by weight of the copolymer.

As fluoro-organic copolymers use is made of copolymers corresponding to the formula:

$$(-CF_2-CRR'-)_n-(-CF_2-CR''R'''-)_m$$

wherein R is F or H; R' is a halogen, R" is $-(-CF=CF-)$ or H;

R''' is H or NO; n = 1 to 4 m = 1 to 4.

At the above-mentioned temperature xenon difluoride is partly decomposed with evolution of elemental fluorine according to the scheme: $XeF_2 \rightarrow Xe + F_2$. The resulting elemental fluorine readily substitutes atoms of H and Cl or reacts at double bonds. Less durable bonds in the copolymer are replaced with a more durable C-F bond. Thermal stability of the copolymer is increased so that the starting point of its decomposition is shifted into the field of higher temperatures by 25° to 50° C.

The lower limit of the temperature of mixing xenon difluoride with the copolymer depends on the copolymer nature and is restricted by its glass transition temperature.

Xenon difluoride is added in an amount of from 0.1 to 15% by weight of the starting copolymer. The optimal amount of the additive is defined by the type of the copolymer for which stabilization it is employed. If the amount of xenon difluoride is less than the amount capable of completely fluorinating weak bonds in the copolymer, the stabilization effect would be insignificant. If a great excess of xenon difluoride is used, then gaseous products evolving upon decomposition can affect the starting physico-mechanical properties of an article.

To improve physico-mechanical properties of an article, after mixing a fluoro-organic copolymer of the ethylene series with xenon difluoride, the resulting mixture is subjected to thermal treatment at a temperature within the range of from 60° to 180° C. The heat treatment duration is defined by the article mass and composition, though, in any case, it should not be less than 24 hours.

The method according to the present invention makes it possible to produce polymers or articles therefrom possessing increased thermal stability and longer service life as compared to the prior art methods. Thus, heat resistance of a copolymer of trifluorochloroethylene with vinylidene fluoride is increased by 50° C., while its service life at the temperature of 250° C. is increased twice.

The method according to the present invention is versatile, i.e. applicable to any type of copolymer of the ethylene series containing bonds which are weaker than the C—F bond.

The method can be performed using any process equipment provided with a cooling system ensuring a mixing temperature of not more than 20° C.

The heat treatment can be combined with the technological cycle of the article's manufacture (drying of a paint coating, curing of a glass plastic, annealing of plastic articles to release the inner stresses).

In the case where polymeric coatings are produced at a temperature of not more than 20° C., xenon difluoride in an amount preferably from 5 to 15% by weight is added into the paint composition or a polymer solution prior to application thereof onto the surface of an article to be coated. The solution is thoroughly intermixed, applied onto the surface being protected and dried in accordance with thermal conditions provided for this particular material with an obligatory thermostatting at a temperature within the range of from 60° to 180° C.

Where articles are to be manufactured from polymers, the process is performed in the following manner. Into a disintegrated polymer or a solution thereof at a temperature of not more than 20° C., xenon difluoride is added in a preferable amount of from 0.1 to 15% by weight. The mixture is thoroughly intermixed and moulded first at a temperature not exceeding 20° C. and then at a temperature required for the manufacture of this article. Provided that the article has not been subjected to thermal treatment at a temperature within the range of from 80° to 180° C. during its manufacture, after moulding the article should be obligatorily thermostatted under said temperature conditions.

In the case of manufacturing rubber articles, the process is performed on a standard equipment provided with cooled rolls. The rubber mix, after mixing all components, is added with xenon difluoride in an amount preferably from 10 to 15% by weight. The mixture is thoroughly intermixed and then moulded, followed by a heat treatment at a temperature within the range of from 80° to 180° C. It is preferred to perform a stepwise heat treatment, i.e. first at the temperature of 80° C. for 1 hour, then at a temperature of from 100° to 120° C. for another hour, with subsequent treatment at 180° C. for 24–48 hours.

In the course of this heat treatment, weak bonds in the polymer get fluorinated to give articles which are substantially superior over articles without a stabilizing agent in their thermal stability. The articles manufactured by the method according to the present invention do not have the disadvantages inherent in articles manufactured with the use of prior art stabilizing agents.

For a better understanding of the present invention, some specific examples are given hereinbelow by way of illustration.

EXAMPLE 1

Into a solution of a copolymer of trifluorochloroethylene with vinylidene fluoride (taken in the molar ratio of 3.5:1) at the temperature of 15° C. xenon difluoride is added in the amount of 10% by weight of the starting copolymer. The mixture is thoroughly agitated and the solution is cast onto a fluoroplastic plate so as to form a coating with a thickness of 50 to 60 mcm. The coated plate is dried first at room temperature for one hour and then in a drying cabinet at 65° C. for 48 hours. Therefore, the resulting film is removed from the fluoroplastic plate surface, washed with dry acetonitrile until no traces of $XeF_2$ are detected. (Analysis for absence of $XeF_2$ is performed by the iodometric method). Then a sample of the film is dried in a vacuum-desiccator to a constant weight and subjected to analysis for the fluorine content. Another sample of the film is subjected to thermal aging at 275° C. to determine the weight loss of the polymer. In a similar manner non-stabilized polymer films are made and tested.

The results of analysis and determination of weight losses are given in the following Table 1.

Table 1

| Film composition | Fluorine content in the film, % by weight | Weight losses at 275° C, wt. % | | |
|---|---|---|---|---|
| | | after one hour | after 5 hours | after 10 hours |
| $(C_2F_3Cl)_{3.5}$—$(C_2F_2H_2$—$)_1$ | 42.2–42.8 | 3.5 | 30.2 | 50 |
| $(C_2F_3Cl)_{3.5}$—$(C_2F_2H_2$—$)_1$ plus 10% by weight of $XeF_2$ | 46.3–46.6 | 2.0 | 22.0 | 25 |

It follows from the data given hereinabove that incorporation of 10% by weight of xenon difluoride into a film made from a copolymer of trifluorochloroethylene with vinylidene fluoride, weak bonds in the copolymer are fluorinated (fluorine content is the copolymer is increased) and weight losses of the copolymer during thermal aging at 275° C. for 10 hours are twice as small as those of the non-stabilized copolymer.

EXAMPLE 2

Into a solution of a copolymer of tetrafluoroethylene with vinylidene fluoride (taken in the molar ratio of 1:4.5) at 15° C. there are added 5 and 10% by weight of xenon difluoride by weight of the starting copolymer. Afterwards, films are manufactured and analyzed in a manner similar to that described in the foregoing Example 1. The results of the analysis and thermal aging of the copolymer films at 350° C. are presented in the following Table 2.

Table 2

| Film composition | Fluorine content in the film, wt. % | Weight losses at 350° C, wt.% after | | |
|---|---|---|---|---|
| | | 1 hour | 5 hours | 10 hours |
| $(C_2F_4$—$)_1$—$(C_2F_2H_2)_{4.5}$ | 64.5–64.9 | 2 | 10 | 25 |
| $(C_2F_4$—$)_1$—$(C_2F_2H_2)_{4.5}$ + 5% by weight of $XeF_2$ | 67.1–67.6 | 1.5 | 7.0 | 17 |
| $(C_2F_4$—$)_1$—$(C_2F_2H_2)_{4.5}$ + 10% by weight of $XeF_2$ | 68.2–68.9 | 1.2 | 4.3 | 11.7 |

From the data given hereinabove it follows that in the case of incorporation of xenon difluoride into the copolymer of tetrafluoroethylene with vinylidene fluoride it is possible to effect fluorination resulting in an increased thermal stability of the copolymer.

EXAMPLE 3

Into a solution of a copolymer of trifluorochloroethylene and vinylidene fluoride at 35° C. there is added 10% of xenon difluoride, calculated for the starting copolymer weight. The mixture is thoroughly agitated and the resulting solution is applied onto a fluoroplastic plate so as to form a coating with a thickness of 50–60 mcm. The plate with the thus-produced coating is dried at 65° C. for 48 hours. The film is removed from the fluoroplastic plate surface, washed with dry acetonitrile till no traces of $XeF_2$ are detected, dried in a vacuum-desiccator to a constant weight and subjected to analysis for the content of fluorine; also determined are weight losses of the copolymer at 300° C.

The test results are given in the following Table 3.

Table 3

| Film composition | Fluorine content of the film, wt.% | Weight losses at 300° C, wt. % after | | |
|---|---|---|---|---|
| | | 1 hour | 5 hours | 10 hours |
| $(C_2F_3Cl)_m-(C_2F_2H_2)_n$ | 42.2–42.8 | 5.0 | 25.9 | 56.0 |
| $(C_2F_3Cl)_m-(C_2F_2H_2)_n$ + 10 wt.% of $XeF_2$ | 42.9–43.1 | 5.1 | 26.3 | 56.2 |

It follows from the data given hereinabove that fluorine has practically no time to effect fluorination of the copolymer. The content of fluorine and weight losses at 300° C. are practically unchanged (the difference is within the limits of the experiment accuracy). This is due to the fact that at 35° C. there occurs decomposition of xenon difluoride in the solution and fluorine is readily removed therefrom along with the solvent.

EXAMPLES 4 to 9

Into a solution of a copolymer of trifluorochloroethylene and vinylidene fluoride at 15° C. xenon difluoride is added in the amount specified in the hereinbelow-given Table 4. The solution is thoroughly mixed and sprayed onto a fluoroplastic plate to form a coating with a thickness of from 50 to 60 mcm.

The thus-produced film is removed from the plate, heat-treated at 80° C. for 24 hours and then subjected to thermal aging at 250° C. and 300° C. respectively. Weight losses of the film as well as its ultimate tensile strength $\sigma_t$ after thermal aging at 250° C. and 300° C. for 25 hours are given in Table 4 hereinbelow.

Table 4

| Example No. | Polymer composition | Xenon difluoride amount, parts by weight | 250° C | | | | 300° C | | | |
|---|---|---|---|---|---|---|---|---|---|---|
| | | | $\delta t$ kgf/cm² | Weight losses, % after | | | $\delta t$ kgf/cm² | Weight losses, % after | | |
| | | | | 1 hr | 2 hrs | 25 hrs | | 1 hr | 2 hrs | 25 hrs |
| 4 | $(C_2F_3Cl)_m-(C_2F_2H_2)_n$ | 0 | 100 | 0.5 | 1.7 | 3.2 | 65 | 4.5 | 39.2 | 74.0 |
| 5 | " | 1 | 110 | 0.2 | 0.8 | 1.0 | 80 | 3.6 | 29.4 | 38.9 |
| 6 | " | 5 | 120 | 0.1 | 0.6 | 0.9 | 110 | 3.0 | 28.2 | 38.8 |
| 7 | " | 10 | 140 | 0.0 | 0.2 | 0.6 | 120 | 3.5 | 27.0 | 37.2 |
| 8 | " | 15 | 140 | 0.0 | 0.0 | 0.4 | 140 | 2.6 | 20.4 | 36.0 |
| 9 | " | 20 | 90 | 0.0 | 0.2 | 0.4 | 80 | 2.7 | 21.2 | 36.8 |

It follows from Table 4 that upon incorporation of xenon difluoride in an amount ranging from 1 to 15 parts by weight there occurs a decrease in weight losses of the film prepared from the copolymer of trifluorochloroethylene with vinylidene fluoride and the ultimate tensile strength of the film after thermal aging at 250° C. and 300° C. respectively for 25 hours is substantially increased. When xenon difluoride is incorporated in the amount of 20 parts by weight, the thermal stability of the film is not reduced (as compared to the sample containing 15 parts by weight of xenon difluoride), but the ultimate tensile strength is substantially reduced which is associated with evolution of large amounts of gaseous products Xe and $F_2$ during the thermal aging of the film, and with deterioration of its structure.

EXAMPLES 10 to 12

Into a rubber mix consisting of 100 parts by weight of a copolymer of fluorinated fluoropropylene with vinylidene fluoride in a ratio of 1:4.5, there are added 3 parts by weight of hexamethylenediamine and 10 parts by weight of magnesia. The mixture is thoroughly milled on rolls, whereafter the rolls are cooled to 10° C. and xenon difluoride is added to the mixture which is again thoroughly milled. Thereafter, plates are moulded and subjected to vulcanization in a stepwise manner: 1 hour at 60° C., 3 hours at 120° C. and 24 hours at 200° C. From the thus-obtained plates test spatulae are cut out which are subjected to thermal aging at 250° C. and ultimate tensile strength of the vulcanizate is determined along with relative elongation. In a similar manner plates are produced without, however, vulcanization thereof at a temperature within the range of from 60° to 200° C.; right after cutting-out the test samples the latter are subjected to thermal aging at 250° C.

The test results are given in the following Table 5.

Table 5

| Example No. | $XeF_2$ amount, Wt. % | Heat-treatment at | Physico-mechanical properties of vulcanizates | | | |
|---|---|---|---|---|---|---|
| | | | prior to thermal aging | | after thermal aging at 250° C for 50 hours | |
| | | | $\delta$, kgf/cm² | $\Delta Z$, % | $\delta$ kgf/cm² | $\Delta Z$, % |
| 10 | 0 | 60 to 200° C | 150 | 120 | 52 | 40 |
| 11 | 10 | 60 to 200° C | 151 | 119 | 102 | 80 |
| 12 | 10 | no heat-treatment | 138 | 106 | 78 | 69 |

It follows from the above-given data that incorporation of xenon difluoride into a vulcanizate, followed by thermal treatment thereof results in a substantially increased heat resistance thereof. On the contrary, without the heat treatment, the starting properties of the vulcanizate are substantially impaired and a less-pronounced stabilizing effect is observed.

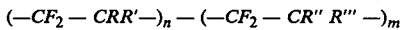

What is claimed is:

1. A method for stabilization of fluoro-organic copolymers of the ethylene series comprising mixing said fluoroorganic copolymer with xenon difluoride taken in an amount of from 0.1 to 15% by weight of the starting copolymer at a temperature of not more than 20° C.

2. A method as claimed in claim 1, wherein after mixing a fluoro-organic copolymer of the ethylene series with xenon difluoride the resulting mixture is subjected to a heat treatment at a temperature ranging from 60° to 180° C.

3. A method as claimed in claim 1, wherein the fluoroorganic copolymers correspond to the formula:

$$(-CF_2 - CRR'-)_n - (-CF_2 - CR''R'''-)_m$$

wherein R is F or H; R' is a halogen, R" is —(CF=CF—) or H;
R''' is H or NO; n = 1 to 4
m = 1 to 4.

4. A method as claimed in claim 1, wherein the stabilization occurs during the manufacture of an article from said copolymer.